United States Patent
Yang et al.

(10) Patent No.: US 12,032,491 B2
(45) Date of Patent: Jul. 9, 2024

(54) METHOD FOR REMAPPING VIRTUAL ADDRESS TO PHYSICAL ADDRESS AND ADDRESS REMAPPING UNIT

(71) Applicant: Shanghai Zhaoxin Semiconductor Co., Ltd., Shanghai (CN)

(72) Inventors: Qunyi Yang, Beijing (CN); Peng Shen, Beijing (CN); Fan Yang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 9 days.

(21) Appl. No.: 18/047,784

(22) Filed: Oct. 19, 2022

(65) Prior Publication Data
US 2023/0125344 A1  Apr. 27, 2023

(30) Foreign Application Priority Data
Oct. 22, 2021 (CN) .......................... 202111237832.1

(51) Int. Cl.
*G06F 12/10* (2016.01)
*G06F 9/48* (2006.01)
*G06F 12/1081* (2016.01)

(52) U.S. Cl.
CPC ........ *G06F 12/1081* (2013.01); *G06F 9/4812* (2013.01)

(58) Field of Classification Search
CPC .. G06F 12/08; G06F 12/0246; G06F 12/1081; G06F 9/4812; G06F 12/02; G06F 12/10; G06F 12/12; G06G 9/4812
See application file for complete search history.

(56) References Cited

U.S. PATENT DOCUMENTS

| 11,599,270 B2* | 3/2023 | Patel | G06F 9/45558 |
| 2003/0037278 A1* | 2/2003 | Olarig | G11C 29/76 |
| | | | 714/5.1 |
| 2006/0288130 A1* | 12/2006 | Madukkarumukumana | G06F 12/1081 |
| | | | 710/22 |

(Continued)

FOREIGN PATENT DOCUMENTS

| GB | 2466711 A | * | 7/2010 | ......... G06F 12/1081 |
| WO | WO-2017165042 A1 | * | 9/2017 | ......... G06F 12/0292 |

OTHER PUBLICATIONS

G. Kornaros, K. Harteros, I. Christoforakis and M. Astrinaki, "I/O virtualization utilizing an efficient hardware system-level Memory Management Unit," 2014 International Symposium on System-on-Chip (SoC), Tampere, Finland, 2014, pp. 1-4.*

(Continued)

*Primary Examiner* — Pierre Michel Bataille
(74) *Attorney, Agent, or Firm* — McClure, Qualey & Rodack, LLP

(57) ABSTRACT

A method for remapping a virtual address to a physical address is provided. The method is used in an address remapping unit and includes: receiving, by a remapping processing unit of the address remapping unit, a remapping request, decoding the remapping request and determining whether the remapping request has a direct memory access (DMA) remapping request; and executing, by the remapping processing unit, a remapping procedure: translating a virtual address corresponding to the remapping request to a physical address, when the remapping request has the DMA remapping request.

18 Claims, 10 Drawing Sheets

(56) References Cited

U.S. PATENT DOCUMENTS

| | | | |
|---|---|---|---|
| 2012/0110278 A1* | 5/2012 | Davis | G11C 13/0004 |
| | | | 711/E12.001 |
| 2012/0117301 A1 | 5/2012 | Wingard | |
| 2016/0085684 A1* | 3/2016 | Borikar | G06F 3/0605 |
| | | | 711/209 |
| 2018/0011651 A1* | 1/2018 | Sankaran | G06F 12/1009 |
| 2018/0232320 A1 | 8/2018 | Raval | |
| 2020/0167291 A1* | 5/2020 | Asaro | G06F 12/1009 |
| 2021/0096774 A1* | 4/2021 | Han | G06F 3/0659 |
| 2021/0271481 A1 | 9/2021 | Tian | |

OTHER PUBLICATIONS

C. Lv, F. Zhang, X. Gao and C. Zhu, "LA-vIOMMU: An Efficient Hardware-Software Co-design of IOMMU Virtualization," 2022 IEEE Intl Conf on Parallel & Distributed Processing with Applications, Big Data & Cloud Computing, Sustainable Computing & Communications, Social Computing & Networking, Melbourne, Australia.*

B. Losa et al., "Memory Management Unit for Hardware-Assisted Dynamic Relocation in On-Board Satellite Systems," in IEEE Transactions on Aerospace and Electronic Systems, vol. 59, No. 5, pp. 6923-6939, Oct. 2023.*

R. Ammendola et al., "Virtual-to-Physical address translation for an FPGA-based interconnect with host and GPU remote DMA capabilities," 2013 International Conference on Field-Programmable Technology (FPT), Kyoto, Japan, 2013, pp. 58-65.*

V. Fochi, E. Wächter, A. Erichsen, A. M. Amory and F. G. Moraes, "An integrated method for implementing online fault detection in NoC-based MPSoCs," 2015 IEEE International Symposium on Circuits and Systems (ISCAS), Lisbon, Portugal, 2015, pp. 1562-1565.*

E. W. Wächter, V. Fochi, F. Barreto, A. M. Amory and F. G. Moraes, "A Hierarchical and Distributed Fault Tolerant Proposal for NoC-Based MPSoCs," in IEEE Transactions on Emerging Topics in Computing, vol. 6, No. 4, pp. 524-537, Oct. 1-Dec. 2018.*

Non-Final Office Action dated Dec. 8, 2023, issued in U.S. Appl. No. 18/047,795.

* cited by examiner

METHOD FOR REMAPPING VIRTUAL ADDRESS TO PHYSICAL ADDRESS AND ADDRESS REMAPPING UNIT

CROSS REFERENCE TO RELATED APPLICATIONS

This application claims priority from China Patent Application No. 202111237832.1, filed on Oct. 22, 2021, the disclosure of which is incorporated herein by reference in its entirety.

BACKGROUND

Technical Field

The present disclosure generally relates to technologies in the field of microelectronics. More specifically, aspects of the present disclosure relate to a method for remapping a virtual address to a physical address and an address remapping unit.

Description of the Related Art

In a computer system, a very important component is the I/O device. The increase in the computing power of the central processing unit (CPU) may increase the data processing speed, but the premise is that the data can be delivered to the CPU in time. Therefore, the processing capacity of I/O devices is an important indicator of a computer system. The purpose of I/O virtualization is to realize data exchange between I/O devices and virtual machines. With the development of virtualization technology and heterogeneous computing, how to improve the performance of address remapping and the speed of searching the cache has become an urgent problem to be solved.

SUMMARY

The following summary is illustrative only and is not intended to be limiting in any way. That is, the following summary is provided to introduce concepts, highlights, benefits and advantages of the novel and non-obvious techniques described herein. Selected, not all, implementations are described further in the detailed description below. Thus, the following summary is not intended to identify essential features of the claimed subject matter, nor is it intended for use in determining the scope of the claimed subject matter.

In an exemplary embodiment, the present disclosure discloses a method for remapping a virtual address to a physical address, used in an address remapping unit. The method comprises: receiving, by a remapping processing unit of the address remapping unit, a remapping request, decoding the remapping request and determining whether the remapping request has a direct memory access (DMA) remapping request; and executing, by the remapping processing unit, a remapping procedure: translating a virtual address corresponding to the remapping request to a physical address, when the remapping request has the DMA remapping request.

In an exemplary embodiment, the present disclosure discloses an address remapping unit. The address remapping unit comprises a remapping processing unit which comprises four parallel processing units. A first processing unit of the processing units receives a remapping request, decodes the remapping request, and determines whether the remapping request has a direct memory access (DMA) remapping request. When the remapping request has the DMA remapping request, the remapping processing unit executes a remapping procedure: translating a virtual address corresponding to the remapping request to a physical address.

BRIEF DESCRIPTION OF DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Figure 1:
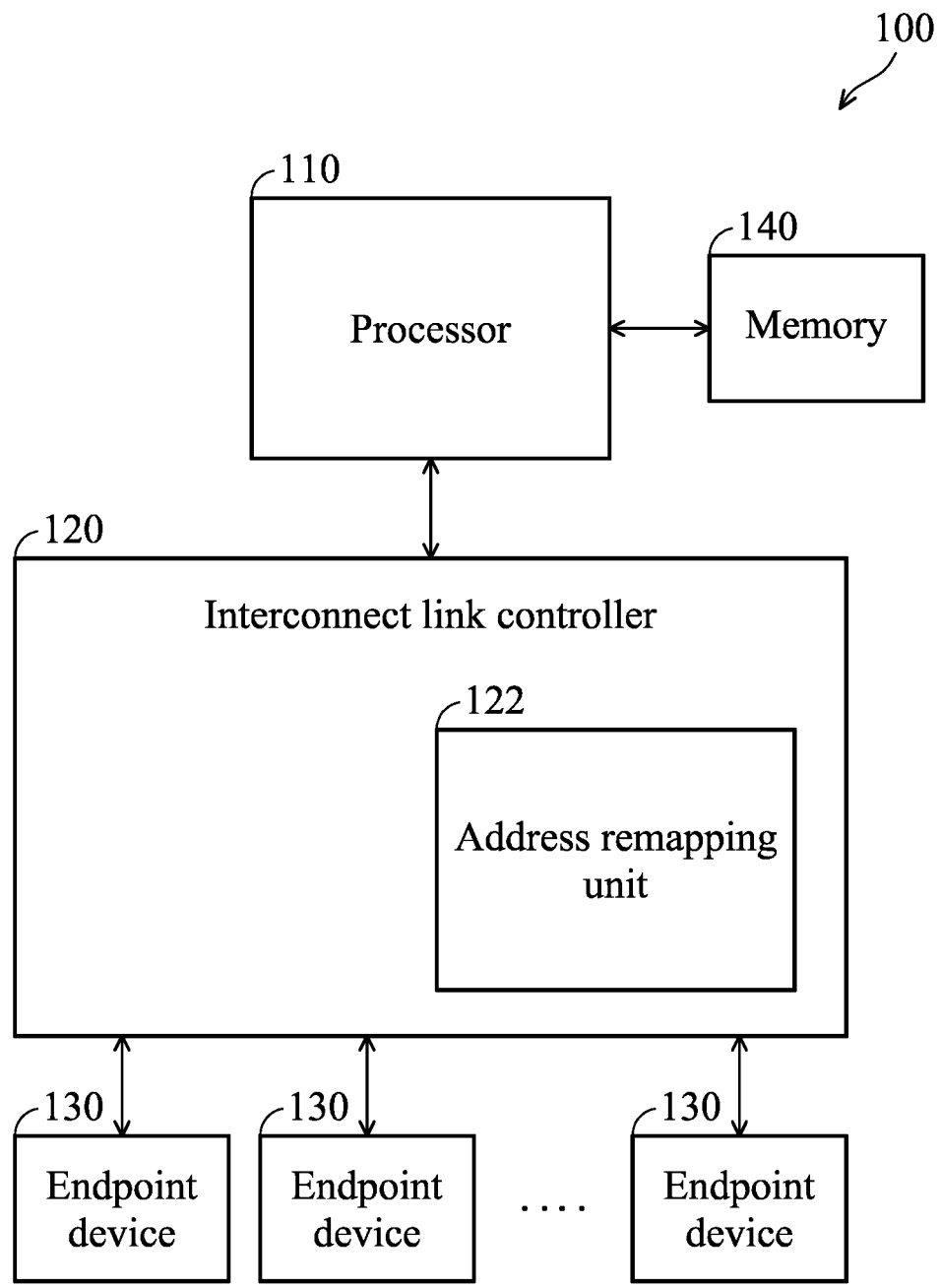
FIG. 1 is a schematic diagram illustrating a system on a chip (SoC) system according to an embodiment of the present disclosure.

FIG. 1 is a schematic diagram illustrating a system on a chip (SoC) system 100 according to an embodiment of the present disclosure. As shown in FIG. 1, the SoC system 100 comprises a processor 110, a interconnect link controller 120, a memory 140, and a plurality of endpoint devices 130.

The processor 110 represents a central processing unit (CPU) of any type of architecture, such as an embedded processor, a mobile processor, a microcontroller, a digital signal processor, a superscalar computer, a vector processor, a single instruction multiple data (SIMD) computer, a complex instruction set (CISC) computer, a reduced instruction set computer (RISC), a very long instruction word (VLIW) or mixed architecture processor.

The endpoint devices 130 may be divided into two types: (1) shared virtual memory (SVM) devices or peripheral component interface express (PCIE) devices that support process address space identifier (PASID) and ATS functions; (2) traditional devices, such as traditional serial bus (SB), universal serial bus (USB), serial advanced technology attachment (Serial ATA), etc.

The memory 140 is coupled to the processor 110 and comprises a plurality of pages, and the memory 140 may be a dynamic random access memory (DRAM). The interconnect link controller 120 is coupled to the processor 110 and the endpoint devices 130, and at least comprises an address remapping unit 122. When an endpoint device 130 transmits a DMA request having a virtual address to the interconnect link controller 120, the interconnect link controller 120 generates a remapping request according to the DMA request and sends the remapping request to the address remapping unit 122. After receiving the remapping request with the DMA request, the address remapping unit 122 translates the virtual address included in the DMA request to a physical address according to a mapping table, generates a remapping response according to the DMA request with the physical address, and sends the remapping response with the DMA request to the interconnect link controller 120. Then, the interconnect link controller 120 transmits the DMA request with the physical address to the processor 110 for further processing. Finally the data transmission between the endpoint device 130 and the memory 140 is completed. In one embodiment, the interconnect link controller 120 may be a north bridge, a chipset, or the like . . . , etc. The processor 110 may be an x86 CPU, an ARM CPU, a MIPS CPU, a PowerPC CPU, a RISC-V CPU, or the like . . . , etc. The memory 140 may be a DRAM (dynamic random access memory), a SRAM (static random access memory), or the like . . . etc.

Figure 2:
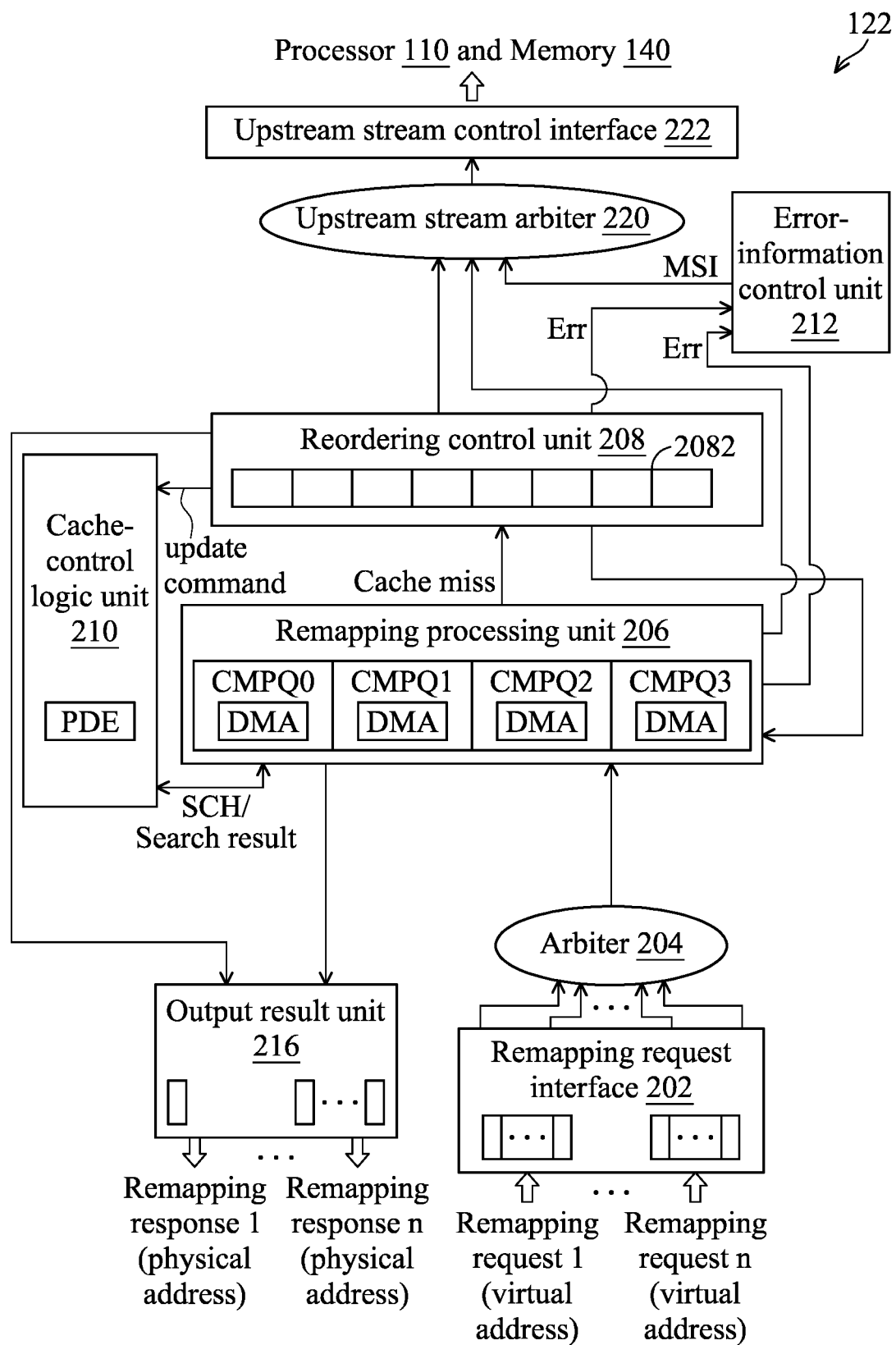
FIG. 2 is a structural diagram of the address remapping unit according to an embodiment of the present disclosure.

In order to achieve high performance, the address remapping unit 122 may comprise some caches. When the settings of the SOC system 100 are changed, the software running on the SOC system 100 may notify the address remapping unit 122 to invalidate the caches. FIG. 2 may be described below with reference to FIG. 1.

FIG. 2 is a structural diagram of the address remapping unit 122 according to an embodiment of the present disclosure.

As shown in FIG. 2, the address remapping unit 122 comprises a remapping request interface 202, an arbiter 204, a remapping processing unit 206 and an output result unit 216. The remapping request interface 202 includes multiple input interfaces (not labeled in FIG. 2), each of which corresponds an endpoint device 130 and is used to receive remapping requests corresponding to the endpoint device 130. The output result unit 216 includes multiple output interfaces (not labeled in FIG. 2), each of which corresponds an endpoint device 130 and is used to output remapping responses corresponding to the endpoint device 130. In order to reduce the mutual influence among the endpoint devices, each endpoint device is coupled to a distinct input interface of the remapping request interface 202 and a distinct output interface of the output result unit 216. The remapping request interface 202 may also support asynchronous interface control or synchronous interface control used for different interface protocols.

After receiving a remapping request (e.g., the remapping request 1, or the remapping request n, etc.) corresponding to the plurality of endpoint devices 130, the remapping request interface 202 transmits the remapping request to the remapping processing unit 206 through the arbiter 204. When the arbiter 204 receives multiple remapping requests at the same time, the arbiter 204 may arbitrate the multiple remapping requests to determine the transmission order, wherein the arbiter 204 may support the algorithms for arbitrating remapping request having normal and high priorities, and support the algorithms for round-robin arbitrations.

As shown in FIG. 2, the address remapping unit 122 also comprises a reordering control unit 208, a cache-control logic unit 210, an error-information control unit 212, an upstream stream arbiter 220, and an upstream stream control interface 222. The reordering control unit 208 comprises eight miss-queue processing units 2082, each of which may obtain a physical address corresponding to a virtual address of a remapping address from the memory 140 through the upstream stream arbiter 220 and upstream stream control interface 222.

The remapping processing unit 206 comprises four parallel processing units CMPQ0 to CMPQ3, wherein each of the processing units CMPQ0 to CMPQ3 may receive and decode a remapping request (e.g., the remapping request 1) corresponding to an endpoint device 130, and determine whether the remapping request has a direct memory access (DMA) remapping request. When the remapping processing unit 206 determines that the remapping request has a DMA remapping request, the remapping processing unit 206 performs a remapping procedure: translating a virtual address corresponding to the remapping request to a physical address. Specifically, when a processing unit (e.g., the CMPQ0) determines that the remapping request has the DMA remapping request, the processing unit may further issue a search command SCH with a virtual address in the remapping request to the cache-control logic unit 210 to search the virtual address in caches (not shown in FIG. 2) of the cache-control logic unit 210. When the cache-control logic unit 210 completes the search for the virtual address, the cache-control logic unit 210 sends a search result to the processing unit (e.g., the CMPQ0) of the remapping processing unit 206.

The processing unit (e.g., the CMPQ0) of the remapping processing unit 206 determines whether cache hit or miss according to the search result. If cache hit, the processing unit generates a remapping response with a physical address in the search result. Then, the processing unit (e.g., the CMPQ0) of the remapping processing unit 206 outputs the remapping response corresponding to the endpoint device 130 through the output interface, corresponding to the endpoint device 130, of the output result unit 216. If cache miss, the processing unit sends the remapping request with a cache miss signal to a miss-queue processing unit 2082 of the reorder control unit 208. Then, the miss-queue processing unit 2082 may issue a read request to the memory 140, to obtain data according to the virtual address in the remapping request from the memory 140, through the upstream stream arbiter 220 and upstream stream control interface 222. After receiving data from the memory 140, the miss-queue processing unit 2082 determines whether the data comprises an error information Err. If the data does not comprise an error information Err, the miss-queue processing unit 2082 sends an update command with a physical address in the data as well as the virtual address to the cache-control logic unit 210 to add the physical address in the data and the virtual address to the caches; at the same time, the miss-queue processing unit 2082 sends the remapping request and the physical address included in the data to a processing unit (e.g., CMPQ0) of the remapping processing unit 206, the processing unit (e.g., CMPQ0) of the remapping processing unit 206 then generates a remapping response with the physical address included in the data, and outputs the remapping response through the output interface corresponding to the endpoint device 130. If the data comprises an error information Err (e.g., the memory corresponding the read request is not accessible), the miss-queue processing unit 2082 discards the remapping request and sends the error information Err to the error-information control unit 212 to report that there is an error when obtaining the physical address; at the same time, the miss-queue processing unit 2082 generates a remapping response with the error information Err, and outputs the remapping response through the output interface, corresponding to the endpoint device 130, of the output result unit 216. In one embodiment, the priority of the update command is higher than the search command SCH.

Since the waiting period for the remapping processing unit 206 to process one DMA remapping request is four cycles (4T), four parallel processing units CMPQ0 to CMPQ3 may be set up to ensure that one DMA remapping request may be processed in each consecutive cycle. The present disclosure is not limited thereto. Generally speaking, if the waiting period to process one DMA remapping request is N cycle(s), N processing unit(s) (e.g., CMPQ0, CMPQ1, etc.) may be set up to ensure that one DMA remapping request may be processed in each consecutive cycle, wherein N is an integer and is greater than or equal to 1.

It should be noted that when the remapping processing unit 206 simultaneously receives remapping requests from the reordering control unit 208 and the arbiter 204, the remapping processing unit 206 may firstly process the request from the reordering control unit 208 since the request from the reordering control unit 208 has a higher priority than the request from the arbiter 204. In addition, when all processing units of the remapping processing unit 206 and all miss-queue processing units 2082 of the reordering control unit 208 are busy (that is, being processing remapping requests) at the same time, if the remapping processing unit 206 and the reordering control unit 208 need to transmit a remapping request to each other, a deadlock may occur because the remapping processing unit 206 does not have any idle processing unit to process the upcoming remapping request and the reordering control unit 208 does not have any idle miss-queue processing unit to process the upcoming remapping request too. To avoid the deadlock, the time when the remapping processing unit 206 transmits the remapping request to the reordering control unit 208 and the time when the reordering control unit 208 transmits the remapping request to the remapping processing unit 206 must be in the same cycle T.

When the remapping processing unit 206 determines that there is an error in the remapping request (e.g., the virtual address in the remapping request is invalid), the remapping processing unit 206 transmits an error information Err to the error-information control unit 212 to report that there is an error in the remapping request. The remapping processing unit 206 transmits a remapping response with the error to the interconnect link controller 120 through the output result unit 216 to discard the remapping request comprising the error. In one embodiment, when the error-information control unit 212 receives the error information Err, the error-information control unit 212 may record the error information Err in an error log register or a resident error log in the memory 140, and transmit a message signaled interrupt (MSI) to the processor 110 for further processing.

The upstream stream arbiter 220 is coupled to the remapping processing unit 206, the error-information control unit 212, and the reordering control unit 208. The upstream arbiter 220 receives notify events (e.g., notifications that need to be processed by the software) from the remapping processing unit 206, the MSIs from the error-information control unit 212, and the read requests from the reordering control unit 208. The upstream arbiter 220 arbitrates and transmits the notify events, the MSIs, and the read requests to the memory 140 or the processor 110 in sequence through the upstream stream control interface 222. In an embodiment, the upstream stream control interface 222 has a four-layer request queue (not shown in FIG. 2) and supports an atomic operation interface.

In an embodiment, the cache-control logic unit 210 may comprise a context cache, a process address space identifier (PASID) cache, an input/output translation lookaside buffer (IOTLB) cache, a Page-Map Level-5 (PML5) cache, a Page-Map Level-4 (PML4) cache, a Page-Directory-Pointer Table Entry (PDPE) cache, and an interrupt remapping table entry (IRTE) cache (not shown in FIG. 2). As shown in FIG. 2, the cache-control logic unit 210 may comprise a Page-Directory Table Entry (PDE) cache. In another embodiment, the cache-control logic unit 210 may support search commands and update commands. In an embodiment, the caches of the cache-control logic unit 210 may comprise a PML5 table, a PML4 table, a Page-Directory-Pointer (PDP) table, a Page-Directory (PD) table, a Page Table (PT) and physical page (not shown in FIG. 2). The PML4 table comprises at least one PML4 Table Entry (PML4E). The PDP table comprises at least one PDP Table Entry (PDPE). The PD table comprises at least one PD Table Entry (PDE). The PT comprises at least one PT Entry (PTE).

Figure 3:
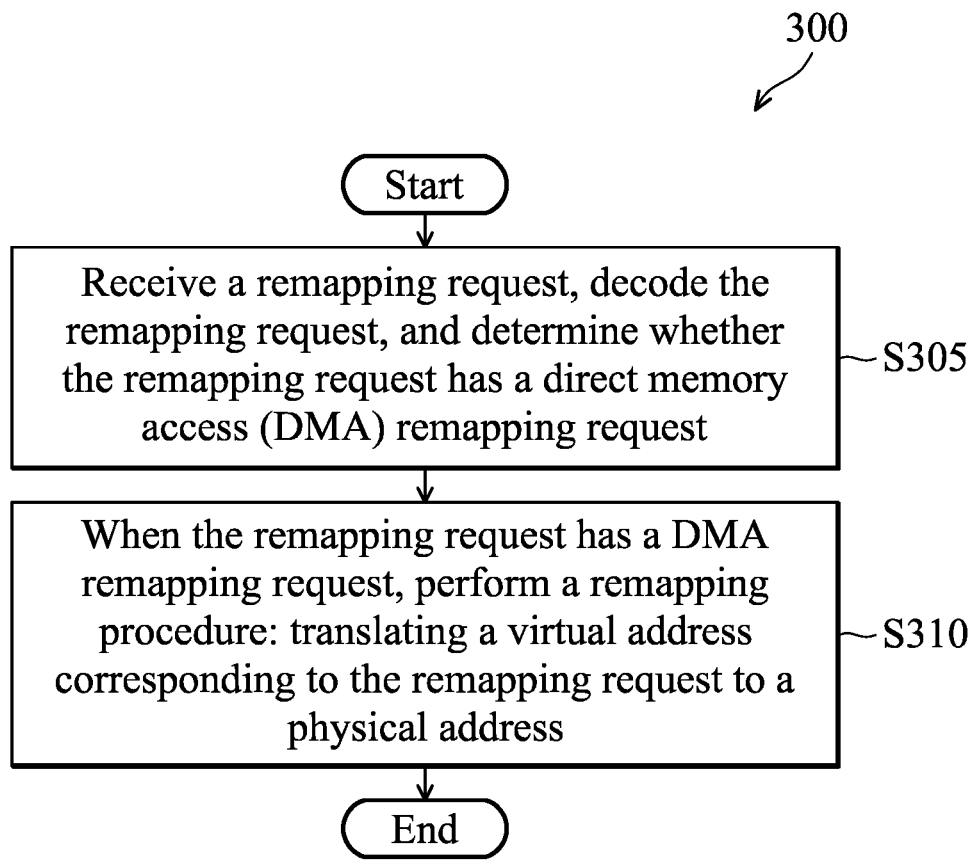
FIG. 3 is a flowchart illustrating a method 300 of remapping a virtual address to a physical address according to an embodiment of the present disclosure.

FIG. 3 is a flowchart illustrating a method 300 of remapping a virtual address to a physical address according to an embodiment of the present disclosure with reference to FIG. 1 and FIG. 2. As shown in FIG. 3, in step S305, the remapping processing unit 206 receives a remapping request, decodes the remapping request, and determines whether the remapping request has a direct memory access (DMA) remapping request. In step S310, when the remapping request has a DMA remapping request, the remapping processing unit 206 performs a remapping procedure: translating a virtual address corresponding to the remapping request to a physical address. As aforementioned, the remapping processing unit 206 translates the virtual address corresponding to the remapping request to a physical address by using the cache-control logic unit 210, which will not be repeated herein. In the present application, the performance of address remapping is improved by using an independent remapping processing unit to translate a virtual address to a physical address.

Figure 4:
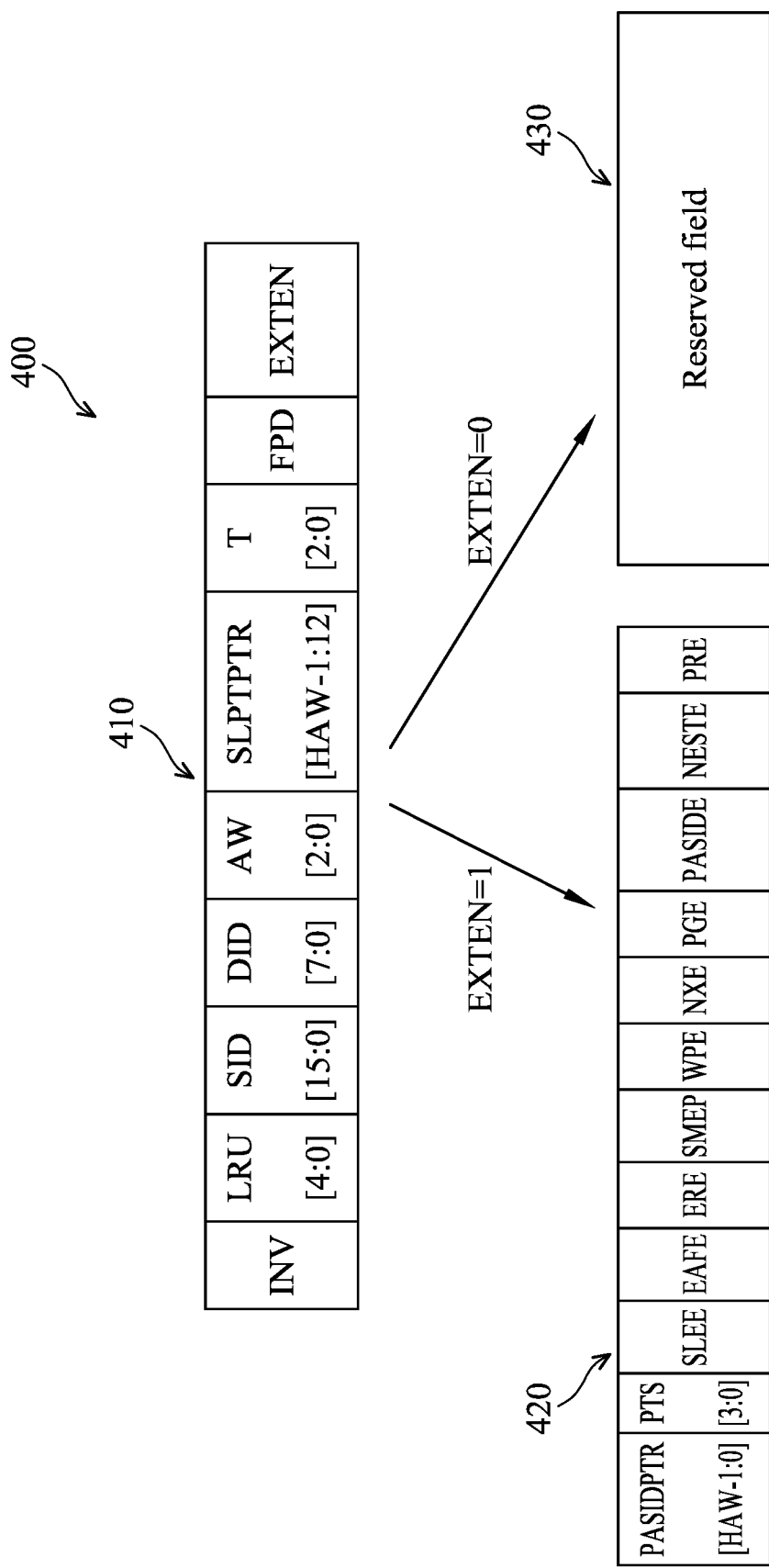
FIG. 4 is a schematic diagram showing a context cache according to an embodiment of the present disclosure.

As aforementioned, the cache-control logic unit 210 is used to translate a virtual address to a physical address by searching cache(s). FIGS. 4 to 9 are used to describe the translating method performed by the cache-control logic unit 210. In order to simplify the hardware implementation, the present disclosure discloses a method translating a virtual address to a physical address through two steps. In the first step, the cache-control logic unit 210 searches a context cache (as shown in FIG. 4) to translate a SID (source identifier) to a DID (domain identifier). In the second step, the cache-control logic unit 210 searches an IOTLB cache (as shown in FIGS. 6 and 8) to translate the virtual address to the physical address according to the DID.

FIG. 4 is a schematic diagram showing a context cache 400 according to an embodiment of the present disclosure.

The context cache 400 is used to cache normal context entries or extended context entries used to process aforementioned search command SCH. The cache-control logic unit 210 searches the context cache 400 to translate a SID included in the search command SCH to a DID (domain identifier) corresponding to the endpoint device 130. In one embodiment, a SLPTPTR (second level page translation pointer, may be used to obtain second-level page-structure entries from the memory) or a PASIDPTR (PASID table pointer, may be used to obtain first-level page-structure entries from the memory) is obtained from the context cache 400 for future use (this will described later) when translating the SID to the DID.

There are two kinds of context entry, one is the normal context entry, and the other is the extended context entry. Before translating the SID to the DID, the software (e.g., the driver of the interconnect link controller 120, the driver of the endpoint device, or the operating system, etc.) may send an extended flag to the cache-control logic unit 210. The cache-control logic unit 210 translates the SID to the DID according to the extended flag by searching the normal context entries or the extended context entries. In one embodiment, the extended flag with 1 indicates that the extended context entries need to be searched, and the extended flag with 0 indicates that the normal context entries need to be searched. Each entry in the context cache 400 is a normal context entry or an extended context entry. An extended field EXTEN of each entry in the context cache 400 is used to indicate that the current context entry stored in the context cache is the normal context entry or the extended context entry. As shown in FIG. 4, the extended field EXTEN which is 1 indicates that the current context entry is the extended context entry that includes fields 410 and fields 420, and the extended field EXTEN which is 0 indicates that the current context entry is the normal context entry that includes fields 410 and field 430. The field 430 is a reserved field.

In one embodiment, fields 410 of the entry of the context cache 400 includes the following information:
(0) EXTEN (extended);
(1) FPD (fault processing disable);
(2) T (translation type);
(3) SLPTPTR;
(4) AW (address width);
(5) DID;
(6) SID;
(7) LRU (least recently used); and
(8) INV (invalid).

In one embodiment, fields 420 of the entry of the context cache 400 includes the following information:
(9) PRE (page request enable);
(10) NESTE (nested translation enable);
(11) PASIDE (PASID enable);
(12) PGE (page global enable);
(13) NXE (no execute enable);
(14) WPE (write protect enable);
(15) SMEP (supervisor mode execute prevention);
(16) ERE (execute requests enable);
(17) EAFE (extended accessed flag enable);
(18) SLEE (second level execute enable);
(19) PTS (PASID table size); and
(20) PASIDPTR.

Figure 5:
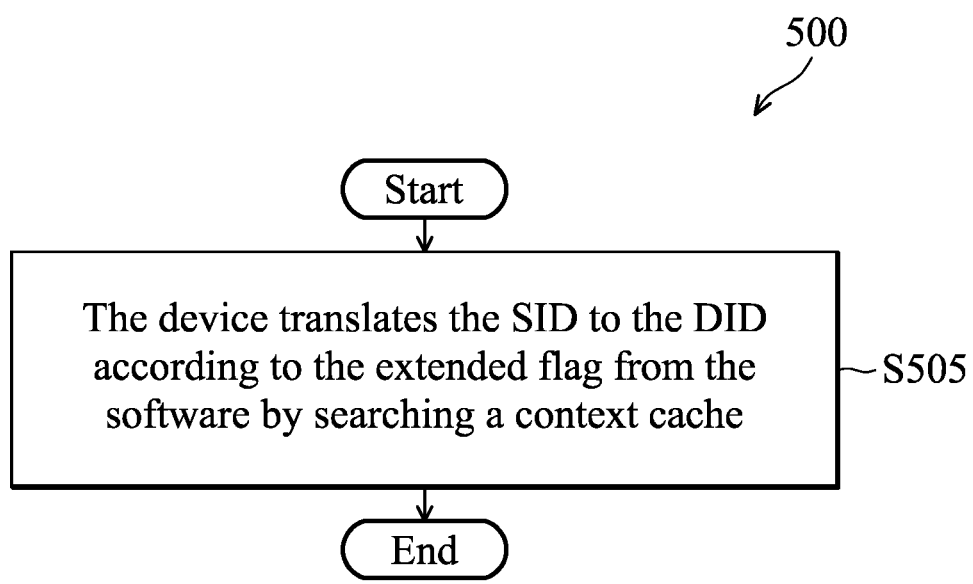
FIG. 5 is a schematic diagram illustrating a method for fast searching the cache according to an embodiment of the present disclosure.
Figure 6:
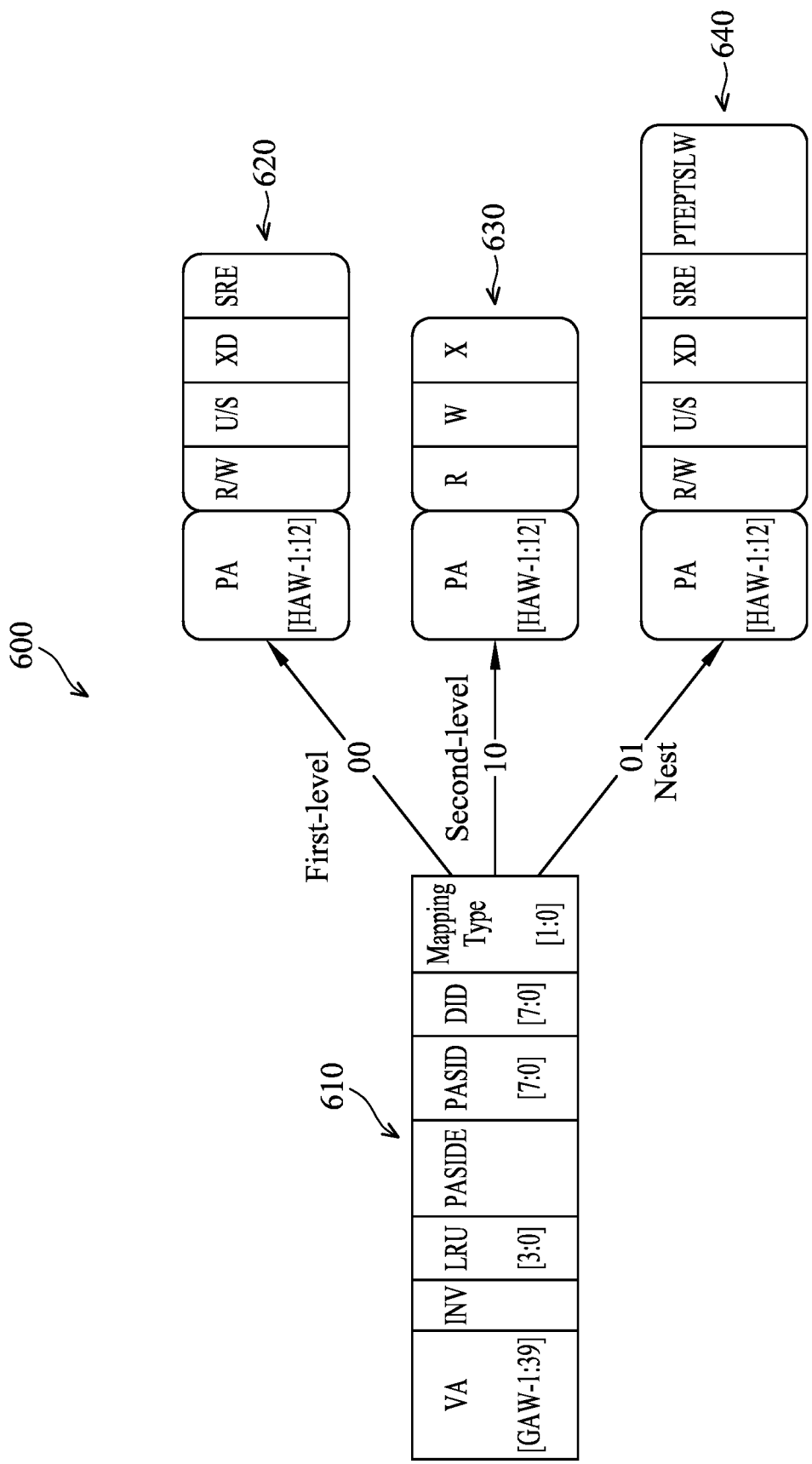
FIG. 6 is a schematic diagram illustrating a page-structure cache according to an embodiment of the present disclosure.

FIG. 5 is a schematic diagram illustrating a method 500 for fast searching the cache according to an embodiment of the present disclosure, and the method is used in a device for fast searching the cache, wherein the device may be an address remapping unit (e.g., the address remapping unit 122 in FIG. 1). In step S505, the device translates the SID to the DID according to the extended flag from the software by searching a context cache. Specifically, the extended field EXTEN which is 1 indicates that the current context entry is the extended context entry, and the extended field EXTEN which is 0 indicates that the current context entry is the normal context entry. When the extended flag from the software is 1, the context entries whose extended field EXTEN is 1 are searched to translate the SID to the DID. When the extended flag from the software is 0, the context entries whose extended field EXTEN is 0 are searched to translate the SID to the DID.

As mentioned above, in the present disclosure, only one cache (e.g., the context cache 400) is needed to save both the normal context entries and the extended context entries, so the hardware implementation is simplified.

A remapping hardware may store page-structure entries that refer to other page-structure entries in the IOTLB cache. As aforementioned, the remapping hardware (e.g., the address remapping unit 122 in FIG. 1) searches the IOTLB cache to translate the virtual address to the physical address according to the DID. In one embodiment, if cache miss when searching the IOTLB cache, the reordering control unit 208 of the address remapping unit 122 may obtain the physical address from the memory 140 according to the SLPTPTR or the PASIDPTR as described above, which is not repeated herein.

There are three types of page-structure entries that are as follows:
(1) First-level page-structure entries: each entry is a physical address of the first-level page-structure mapped from the upper part of the input address in the request with PASID (process address space identifier) to the corresponding area of the input address space, and comprises information about access permissions.
(2) Second-level page-structure entries: each entry is a physical address of the second-level page-structure mapped from the upper part of the guest physical address to the corresponding area used to translate the customer physical address space, and comprises information about access permissions.

(3) Nest page-structure entries: each entry is a physical address of the first-level page-structure (after nesting through the second-level translation) mapped from the upper part of the input address in the request with PASID to the corresponding area of the input address space, and comprises information about access permissions.

FIG. 6 is a schematic diagram illustrating a page-structure cache 600 according to an embodiment of the present disclosure. In this embodiment, the page-structure cache 600 described above is a PML4E cache, which mainly includes the following information 610:

(1) DID;
(2) PASID;
(3) PASIDE;
(4) LRU;
(5) INV; and
(6) VA (virtual address).

In addition to the information 610, the first-level page-structure entries may also include the following information 620:

(7) R/W (read/write);
(8) U/S (user/supervisor);
(9) XD (execute disable); and
(10) SRE (supervisor requests enable).

In addition to the information 610, the second-level page-structure entries may also include the following information 630:

(7) R (read);
(8) W (write); and
(9) X (execute).

In addition to the information 610, the nest page-structure entries may also include the following information 640:

(7) R/W;
(8) U/S;
(9) XD;
(10) SRE; and
(11) PTEPTSLW (PTE pointer write permission).

In order to simplify page traversal and simplify hardware implementation, the three type PML4E entries are all cached in the PML4E cache of the disclosure. A page-structure cache includes a mapping type field indicating that the current page-structure entry stored in the page-structure cache is a first-level page-structure entry, a second-level page-structure entry or a nest page-structure entry. As shown in FIG. 6, the mapping type field includes two bits, wherein the mapping type field which is 00 indicates that the current page-structure entry is the first-level page-structure entry, and the mapping type field which is 10 indicates that the current page-structure entry is the second-level page-structure entry, and the mapping type field which is 01 indicates that the current page-structure entry is the nest page-structure entry.

Figure 7:
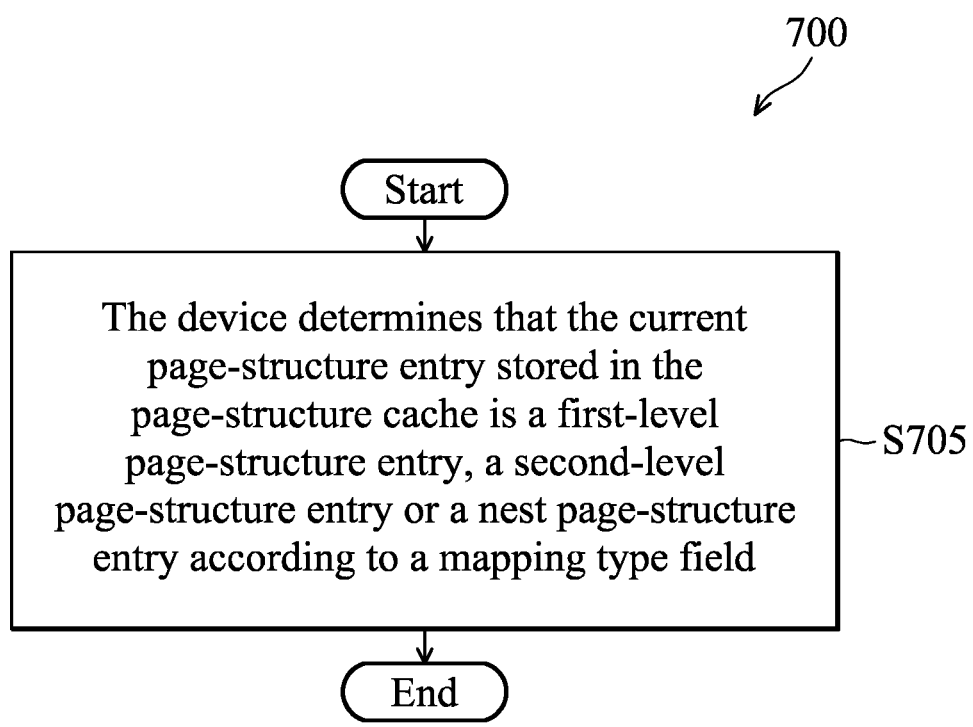
FIG. 7 is a schematic diagram illustrating a method for fast searching the cache according to an embodiment of the present disclosure.
Figure 8:
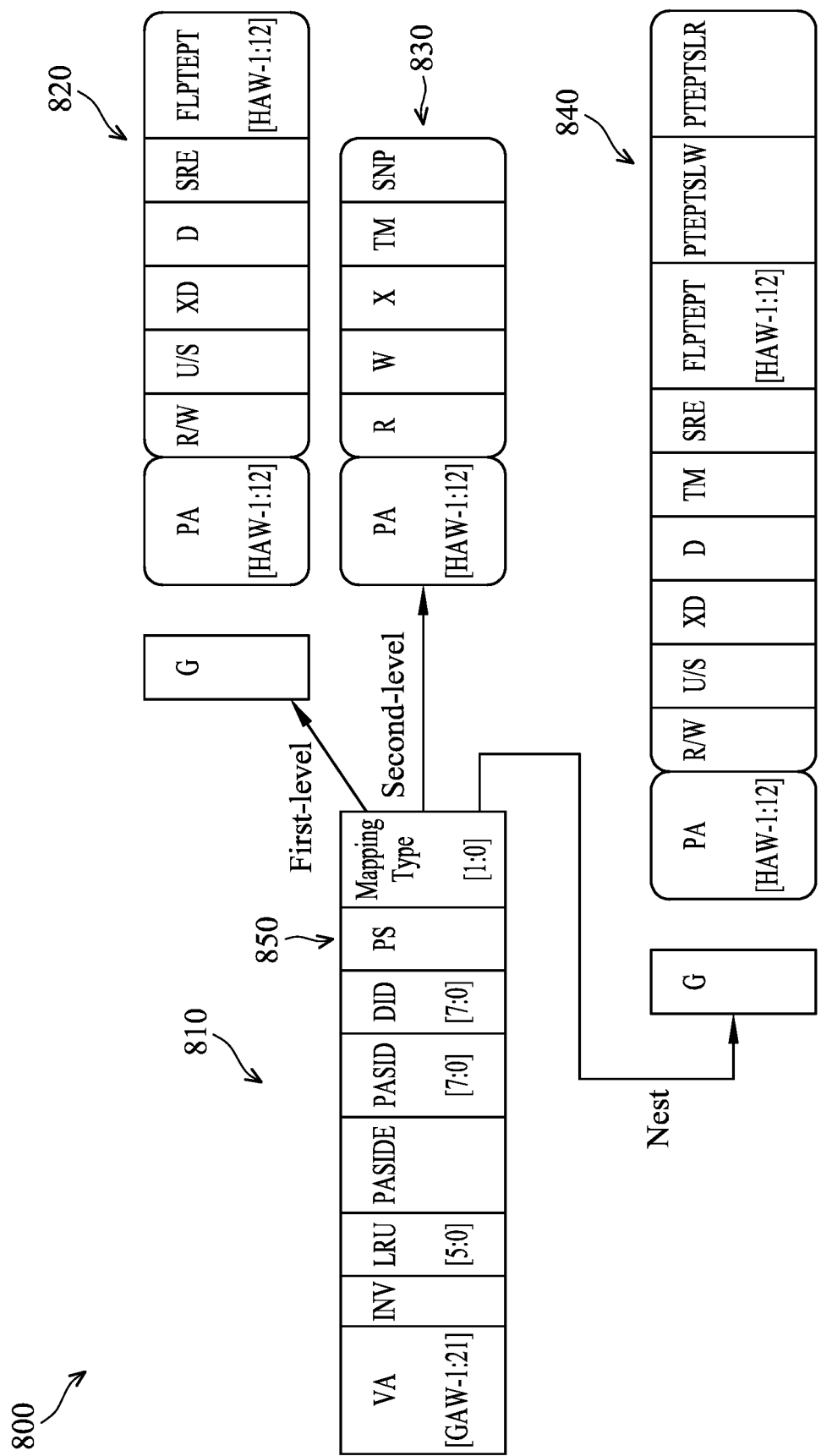
FIG. 8 is a schematic diagram illustrating a page-structure cache according to an embodiment of the present disclosure.

FIG. 7 is a schematic diagram illustrating a method 700 for fast searching the cache according to an embodiment of the present disclosure, and the method is used in a device for fast searching the cache, wherein the device may be the address remapping unit 122. In step S705, the device determines that the current page-structure entry stored in the page-structure cache is a first-level page-structure entry, a second-level page-structure entry or a nest page-structure entry according to a mapping type field. Specifically, the mapping type field which is 00 indicates that the current page-structure entry is the first-level page-structure entry, and the mapping type field which is 10 indicates that the current page-structure entry is the second-level page-structure entry, and the mapping type field which is 01 indicates that the current page-structure entry are the nest page-structure entry.

As mentioned above, in the present disclosure, only one cache (e.g., the page-structure cache 600) is needed to save all the first-level page-structure entries, the second-level page-structure entries and the nest page-structure entries, so the hardware implementation is simplified.

When the page-structure specifies a translation using a page larger than 4 kilobytes (KB), some hardware implementations may choose to cache multiple smaller page IOTLB entries for that translation.

There is a disadvantage of implementing cache in this way. Take the 2 MB super page (a page larger than 4 KB is called a super page) as an example, when the first remapping request with the virtual address VA [HAW-1: 12]='h123456 is transmitted to the remapping processing unit 206, the cache may miss. Then, the reordering control unit 208 retrieves a PDE, which is a 2 MB super page, from the memory 140 according to the virtual address VA. After the translation is completed, the PDE may be cached in the IOTLB cache, but the super page information cannot be stored in the IOTLB cache. Because the super page information is not stored in the IOTLB cache, when the second remapping request with the virtual address VA [HAW-1: 12]='h123457 is transmitted to the remapping processing unit 206, the cache will miss, which means there is need to retrieve the PDE from the memory 140 again. Therefore the efficiency is reduced.

The following may explain how the problems are solved in the present disclosure. The cache-control logic unit 210 further includes a PDE cache, used to store the super page PDE, in the present disclosure. Take the above example again. When the PDE corresponding to the first remapping request is retrieved, the reordering control unit 208 may find that the PDE is a 2 MB super page. At this time, the PDE is not stored into the IOTLB cache, but stored into the PDE cache. Specifically, each PDE cache entry includes a page size (PS) field to indicate that the current page-structure entry stored in the page-structure cache is a 2 MB super page entry or a 1 GB super page entry, wherein the PS field includes one bit. The PS field which is 0 indicates that the current page entry is a 1 GB super page entry, and the PS field which is 1 indicates that the current page entry is a 2 MB super page entry. When the second remapping request is transmitted to the remapping processing unit 206, the IOTLB cache and the PDE cache are simultaneously searched for the virtual address included in the second remapping request. Because of the super page information is already stored in the PDE cache, the PDE cache will hit (the IOTLB cache will not hit), which means there is no need to retrieve the PDE from the memory 140 again. Therefore the efficiency is increased.

FIG. 8 is a schematic diagram illustrating a page-structure cache 800 according to an embodiment of the present disclosure. As shown in FIG. 8, the difference from the page-structure 610 in FIG. 6 is that a new PS field 850 is included in the page-structure 810 in FIG. 8 to indicate that the current page-structure entry stored in the page-structure cache is a 2 MB super page entry or a 1 GB super page entry. In this way, after the second remapping request is transmitted to the remapping processing unit, the PDE cache may be searched to perform the translation of the virtual address to improve the translation efficiency. In addition, the G in FIG. 8 is short for global, the D in the page-structures 820 and 840 is short for dirty, the TM in the page-structures 830 and 840 is short for transient mapping, the SNP in the page-structure 830 is short for snoop, the FLPTEPT in the page-structures 820 and 840 is short for first level PTE table start address, and the PTEPTSLR in the page-structure 840 is short for PTE pointer read permission.

Figure 9:
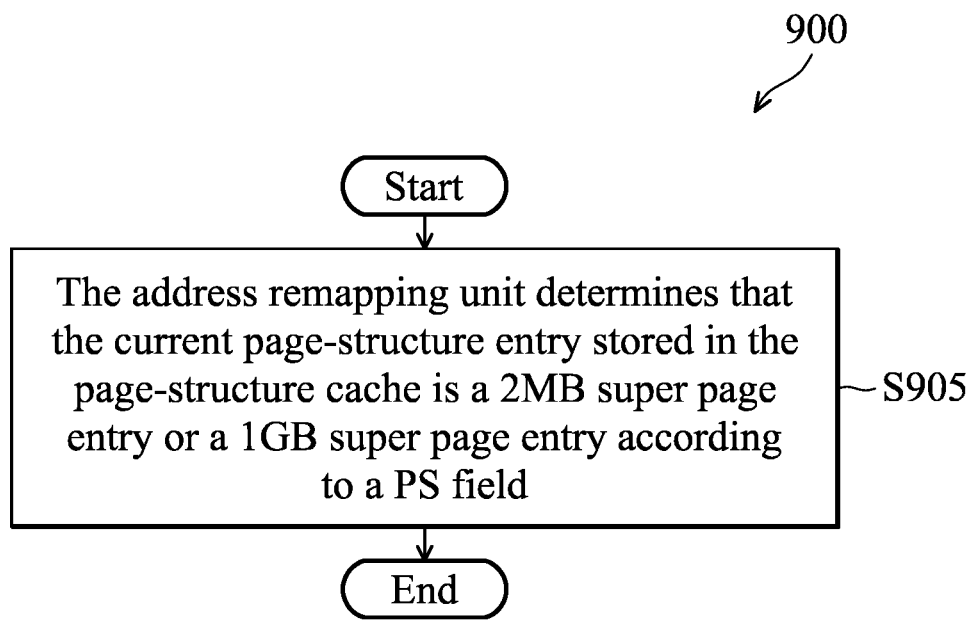
FIG. 9 is a schematic diagram illustrating a method for fast searching a cache according to an embodiment of the present disclosure.

FIG. 9 is a schematic diagram illustrating a method 900 for fast searching a cache according to an embodiment of the present disclosure, and the method is used in a device for fast searching the cache, wherein the device may be an address remapping unit. In step S905, the address remapping unit determines that the current page-structure entry stored in the page-structure cache is a 2 MB super page entry or a 1 GB super page entry according to a PS field. Specifically, the PS field which is 0 indicates that the current page-structure entry is the 1 GB super page entry and the PS field which is 1 indicates that the current page-structure entry is the 2 MB super page entry.

In summary, the method and address remapping unit for remapping a virtual address to a physical address proposed in this disclosure realize that each endpoint device corresponds to a distinct input interface for receiving remapping requests and a distinct output interface for outputting remapping responses, so as to reduce the mutual influence among the endpoint devices. Furthermore, since the remapping processing unit 206 includes four parallel processing units, the address remapping unit 122 may process one remapping request in each consecutive cycle (T) in the case of cache hit, which improves the efficiency of address remapping. In addition, a method and device for fast searching a cache to translate a virtual address to a physical address are further mentioned in this disclosure, which improves the search efficiency by using a two-step search method. An extended field EXTEN included in the context cache is used to indicate that the current context entry is a normal context entry or an extended context entry. Furthermore, a cache structure suitable for a variety of page-structure entries is implemented in this disclosure. A mapping type field included in the page-structure cache is used to indicate that the current page-structure entry is a first-level page-structure entry, a second-level page-structure entry or a nest page-structure entry, and a field PS included in the page-structure cache is used to indicate that the current page-structure entry is a 2 MB super page-structure entry or a 1 GB super page-structure entry, which simplifies search processing and improves cache hit rate.

Figure 10:
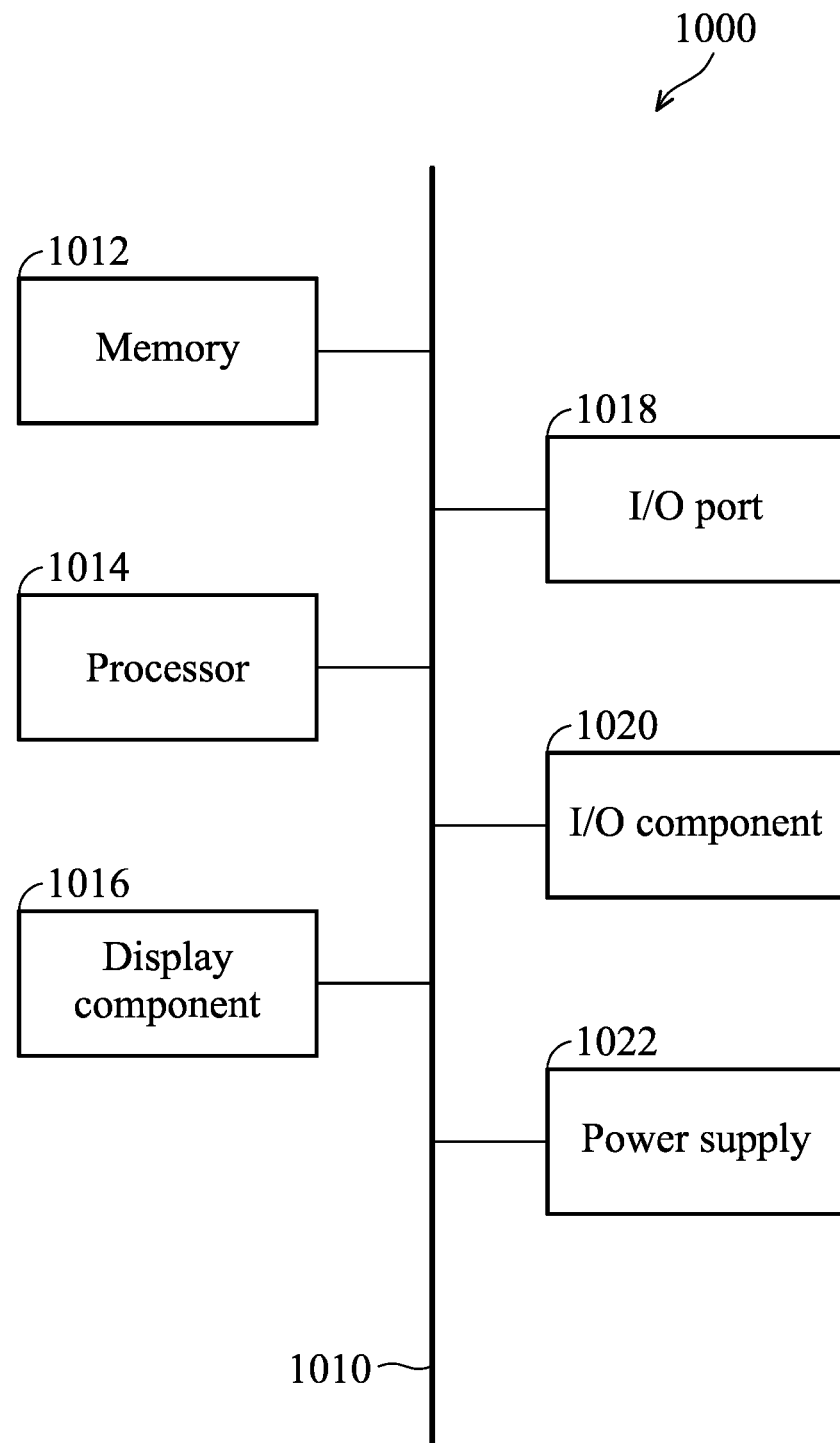
FIG. 10 illustrates an exemplary operating environment for implementing embodiments of the present disclosure.

Having described embodiments of the present disclosure, an exemplary operating environment in which embodiments of the present disclosure may be implemented is described below. Referring to FIG. 10, an exemplary operating environment for implementing embodiments of the present disclosure is shown and generally known as a computing device 1000. The computing device 1000 is merely an example of a suitable computing environment and is not intended to limit the scope of use or functionality of the disclosure. Neither should the computing device 1000 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other hand-held device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 10, the computing device 1000 may include a bus 1010 that is directly or indirectly coupled to the following devices: one or more memories 1012, one or more processors 1014, one or more display components 1016, one or more input/output (I/O) ports 1018, one or more input/output components 1020, and an illustrative power supply 1022. The bus 1010 may represent one or more kinds of busses (such as an address bus, data bus, or any combination thereof). Although the various blocks of FIG. 10 are shown with lines for the sake of clarity, and in reality, the boundaries of the various components are not specific. For example, the display component 1016 such as a display device may be considered an I/O component and the processor may include a memory.

The computing device 1000 typically includes a variety of computer-readable media. The computer-readable media may be any available media that may be accessed by computing device 1000 and includes both volatile and nonvolatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 1000. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 1012 may include computer-storage media in the form of volatile and/or nonvolatile memory. The memory may be removable, non-removable, or a combination thereof. Exemplary hardware devices include solid-state memory, hard drives, optical-disc drives, etc.

The computing device 1000 includes one or more processors that read data from various entities such as the memory 1012 or the I/O components 1020. The display component(s) 1016 present data indications to a user or to another device. Exemplary presentation components include a display device, speaker, printing component, vibrating component, etc.

The I/O ports 1018 allow the computing device 1000 to be logically coupled to other devices including the I/O components 1020, some of which may be embedded. Illustrative components include a microphone, joystick, game pad, satellite dish, scanner, printer, wireless device, etc. The I/O components 1020 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 1000, or any combination thereof. The computing device 1000 may be equipped with depth cameras, such as stereoscopic camera systems, infrared camera systems, RGB camera systems, or any combination thereof, to realize gesture detection and recognition. Furthermore, the computing device 1000 may be equipped with accelerometers or gyroscopes that enable detection of motion. The output of the accelerometers or gyroscopes may be provided to the display of the computing device 1000 to carry out immersive augmented reality or virtual reality.

Furthermore, the processor 1014 in the computing device 1000 can execute the program code in the memory 1012 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An address remapping unit, comprising:
a remapping processing unit, comprising:
four parallel processing units, wherein a first processing unit of the processing units receives a remapping request, decodes the remapping request, and determines whether the remapping request has a direct memory access (DMA) remapping request; and
when the remapping request has the DMA remapping request, the remapping processing unit executes a remapping procedure: translating a virtual address corresponding to the remapping request to a physical address;
wherein when the remapping processing unit determines that there is an error in the remapping request, the remapping processing unit further executes:
transmitting error information to an error-information control unit to report that there is an error in the remapping request; and
transmitting a remapping response with the error to an output result unit to inform an interconnect link controller to discard the remapping request.

2. The address remapping unit as claimed in claim 1, further comprising:
a remapping request interface, receiving the remapping request corresponding to an endpoint device; and
an arbiter, coupled to the remapping request interface and the remapping processing unit, receiving the remapping request from the remapping request interface, and transmitting the remapping request to the remapping processing unit.

3. The address remapping unit claimed in claim 1, wherein after the error-information control unit receives the error information, the error-information control unit records the error information in an error log register or a resident error log in a memory, and transmits a message signaled interrupt (MSI) to a processor.

4. The address remapping unit as claimed in claim 1, further comprising:
an upstream arbiter, coupled to the remapping processing unit, the error-information control unit, the reordering control unit, and a page-request and invalidation-control logic unit, the upstream arbiter executes:
receiving a notify event from the remapping processing unit, a message signaled interrupt (MSI) from the error-information control unit, and a read request from the reordering control unit; and
transmitting the notify event, the MSI, and the read request to the memory or the processor in sequence through an upstream control interface.

5. The address remapping unit as claimed in claim 1, wherein when the first processing unit determines that the remapping request has the DMA remapping request, the remapping processing unit further executes:
issuing a search command to a cache-control logic unit; and
when the cache-control logic unit completes the search for the virtual address, sending, by the cache-control logic unit, a search result to the remapping processing unit;
determining, by the remapping processing unit, whether cache hit or miss according to the search result; and
if cache miss, sending, by the remapping processing unit, the remapping request with a cache miss signal to a reordering control unit.

6. The address remapping unit as claimed in claim 5, wherein if cache hit, the remapping processing unit generates a remapping response with a physical address included in the search result, and outputs the remapping response through an output interface corresponding to the endpoint device.

7. The address remapping unit as claimed in claim 1, wherein:
the address remapping unit comprises a physical address output interface, the physical address output interface couples to the remapping processing unit, the physical address output interface receives the physical address from the remapping processing unit and outputs a remapping response with the physical address corresponding to the endpoint device.

8. A method for remapping a virtual address to a physical address, used in an address remapping unit, comprising:
receiving, by a remapping processing unit of the address remapping unit, a remapping request, decoding the remapping request and determining whether the remapping request has a direct memory access (DMA) remapping request; and
executing, by the remapping processing unit, a remapping procedure: translating a virtual address corresponding to the remapping request to a physical address, when the remapping request has the DMA remapping request;
wherein the method further comprises:
transmitting, by the remapping processing unit, error information to an error-information control unit to report that there is an error in the remapping request when the remapping processing unit determines that there is an error in the remapping request; and
transmitting, by the remapping processing unit, a remapping response with the error to an output result unit to inform an interconnect link controller to discard the remapping request.

9. The method for remapping a virtual address to a physical address as claimed in claim 8, further comprising:
receiving, by a remapping request interface of the address remapping unit, the remapping request corresponding to an endpoint device; and
receiving, by an arbiter of the address remapping unit, the remapping request from the remapping request interface, and transmitting the remapping request to the remapping processing unit.

10. The method for remapping a virtual address to a physical address as claimed in claim 8, wherein after the error-information control unit receives the error information, the error-information control unit records the error information in an error log register or a resident error log in a memory, and transmits a message signaled interrupt (MSI) to a processor.

11. The method for remapping a virtual address to a physical address as claimed in claim 8, further comprising:
receiving, by an upstream arbiter of the address remapping unit, a notify event from the remapping processing unit, a message signaled interrupt (MSI) from an error-information control unit, and a read request from a reordering control unit; and
transmitting, by the upstream arbiter, the notify event, the MSI, and the read request to the memory or the processor in sequence through an upstream control interface.

12. The method for remapping a virtual address to a physical address as claimed in claim 8, wherein when the remapping request has the DMA remapping request, the method further comprising:
issuing, by the remapping processing unit, a search command to a cache-control logic unit;
when the cache-control logic unit completes the search for the virtual address, sending, by the cache-control logic unit, a search result to the remapping processing unit;
determining, by the remapping processing unit, whether cache hit or miss according to the search result; and
if cache miss, sending, by the remapping processing unit, the remapping request with a cache miss signal to a reordering control unit.

13. The method for remapping a virtual address to a physical address as claimed in claim 12, further comprising:
if cache hit, generating, by the remapping processing unit, a remapping response with a physical address included in the search result; and
outputting, by the remapping processing unit, the remapping response through an output interface corresponding to the endpoint device.

14. The method for remapping a virtual address to a physical address as claimed in claim 12, further comprising:
issuing, by the reordering control unit, a read request to a memory when the reordering control unit receives the remapping request with the cache miss signal from the remapping processing unit;
receiving, by the reordering control unit, data from the memory and determining whether the data comprises error information; and
discarding, by the reordering control unit, the remapping request and transmitting the error information to an error-information control unit to report that there is an error in the remapping request when the data comprises the error information.

15. The method for remapping a virtual address to a physical address as claimed in claim 14, wherein when the data does not comprise the error information, the reordering control unit issues an update command with a physical address included in the data to update a cache of the cache-control logic unit.

16. The method for remapping a virtual address to a physical address as claimed in claim 15, wherein a priority of the update command is higher than the search command.

17. The method for remapping a virtual address to a physical address as claimed in claim 12, wherein the cache-control logic unit comprises a context cache, a PASID cache, an IOTLB cache, a PML5 cache, a PML4 cache, a PDPE cache, a PDE cache and an IRTE cache.

18. The method for remapping a virtual address to a physical address as claimed in claim 8, further comprising:
receiving, by an output interface of the address remapping unit, a remapping response with the physical address from the remapping processing unit, and outputting the remapping response with the physical address corresponding to the endpoint device.

\* \* \* \* \*